(12) United States Patent
Horion et al.

(10) Patent No.: US 12,722,546 B2
(45) Date of Patent: Sep. 1, 2026

(54) VEHICLE SEAT FOR A MOTOR VEHICLE COMPRISING A DEFORMATION DEVICE

(71) Applicant: Bayerische Motoren Werke Aktiengesellschaft, Munich (DE)

(72) Inventors: Stefan Horion, Apfeldorf (DE); Michael Leng, Geltendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 133 days.

(21) Appl. No.: 18/707,224

(22) PCT Filed: Oct. 14, 2022

(86) PCT No.: PCT/EP2022/078601
§ 371 (c)(1),
(2) Date: May 3, 2024

(87) PCT Pub. No.: WO2023/088618
PCT Pub. Date: May 25, 2023

(65) Prior Publication Data

US 2025/0042315 A1 Feb. 6, 2025

(30) Foreign Application Priority Data

Nov. 16, 2021 (DE) ..................... 10 2021 129 860.1

(51) Int. Cl.
*B60N 2/427* (2006.01)

(52) U.S. Cl.
CPC ..... *B60N 2/42709* (2013.01); *B60N 2/42745* (2013.01)

(58) Field of Classification Search
CPC ............ B60N 2/42709; B60N 2/42745; B60N 2/4228
See application file for complete search history.

(56) References Cited

U.S. PATENT DOCUMENTS 7,163,261 B2 * 1/2007 Kawashima ....... B60N 2/42745 297/216.12
10,315,541 B2 * 6/2019 Kostin ..................... B60N 2/16
(Continued)

FOREIGN PATENT DOCUMENTS

DE 198 31 218 A1 1/2000
DE 102006003651 A1 * 8/2007 ............... B60N 2/22
(Continued)

OTHER PUBLICATIONS

International Search Report (PCT/ISA/210) issued in PCT Application No. PCT/EP2022/078601 dated Jan. 19, 2023 with English translation (5 pages).
(Continued)

*Primary Examiner* — Philip J Bonzell
(74) *Attorney, Agent, or Firm* — Crowell & Moring, LLP

(57) ABSTRACT

A vehicle seat for a motor vehicle has a backrest which is mounted, so as to be pivotable about a pivot axis, on a fitting that is located on the associated seat side and is connected to a seat side part of a seat part, the seat side part being located on the seat side, via a deformation device. The deformation device has a bolt that is accommodated in a deformation element of the fitting and can be displaced along a deformation guide in the event of an accident-induced overload. A sliding element is located between the fitting and the seat side part.

8 Claims, 3 Drawing Sheets

(56) References Cited

U.S. PATENT DOCUMENTS

| | | | | |
|---|---|---|---|---|
| 12,024,074 | B2 * | 7/2024 | Höcks | B60N 2/682 |
| 2005/0077763 | A1 * | 4/2005 | Kawashima | B60N 2/42745 297/216.14 |
| 2010/0176621 | A1 | 7/2010 | Aufrere et al. | |
| 2014/0339865 | A1 | 11/2014 | Schwarze et al. | |
| 2017/0259713 | A1 * | 9/2017 | Kostin | B60N 2/02246 |
| 2022/0274513 | A1 * | 9/2022 | Höcks | B60N 2/682 |

FOREIGN PATENT DOCUMENTS

| | | | | |
|---|---|---|---|---|
| DE | 11 2007 001 883 | T5 | 6/2009 | |
| DE | 10 2011 055 860 | A1 | 6/2013 | |
| DE | 102017208875 | A1 * | 11/2018 | B60N 2/682 |
| EP | 3 789 238 | A1 | 3/2021 | |
| KR | 20140068669 | A * | 6/2014 | B60N 2/682 |
| WO | WO-2018215395 | A1 * | 11/2018 | B60N 2/682 |

OTHER PUBLICATIONS

German-language Written Opinion (PCT/ISA/237) issued in PCT Application No. PCT/EP2022/078601 dated Jan. 19, 2023 with English translation (10 pages).

German-language Office Action issued in German Application No. 10 2021 129 860.1 dated Jun. 1, 2022 (3 pages).

* cited by examiner

VEHICLE SEAT FOR A MOTOR VEHICLE COMPRISING A DEFORMATION DEVICE

BACKGROUND AND SUMMARY

The invention relates to a vehicle seat for a motor vehicle.

Such a vehicle seat has already been disclosed in DE 198 31 218 A1, in which a backrest is mounted, so as to be pivotable about a pivot axis in order to adjust the inclination, on a respective fitting which is arranged on the associated seat side of a seat part. These two fittings are connected to a seat side part, which is arranged on the respective seat side, of the seat part via a respective deformation device which has a bolt which is received in a deformation element of the fitting and can be displaced along a deformation guide in the event of an accident-induced overload. As a result, in the event of a rear impact on the motor vehicle, the backrest can be displaced rearward in its inclination in order to avoid an excessive acceleration of the seat occupant.

What is problematic here is that, in the case of deformation devices of the known type, the displacement movement of the backrest relative to the seat part can be controlled only with great difficulty in the event of an accident-induced overload.

It is therefore the object of the present invention to provide a vehicle seat of the type stated at the outset in which the displacement movement of the backrest with respect to the seat part can be controlled in an improved manner in the event of an accident-induced overload.

This object is achieved according to the invention by a vehicle seat having the features of the independent claims. Advantageous developments form the subject matter of the dependent claims.

The vehicle seat according to the invention comprises a backrest which is held via respective fittings on a seat part of the vehicle seat and can be displaced about a respective pivot axis relative to the respectively associated fitting in order to adjust the inclination. The fitting arranged for each respective seat side is connected via a respective deformation device to the laterally corresponding seat side part of the seat part. This deformation device comprises a bolt which is received in a deformation element of the fitting and can be displaced along a deformation guide in the event of an accident-induced overload in order to avoid excessive accelerations of the seat occupant.

In order, in the event of an accident-induced overload, to be able to better control a corresponding displacement movement of the backrest relative to the seat part, at least one sliding element is arranged between the fitting and the seat side part. By virtue of the arrangement of a corresponding sliding part, the friction component between the fitting or the associated deformation element on the one hand and the laterally corresponding seat side part on the other hand can thus be reduced, as a result of which, in a desired manner, a corresponding displacement movement of the backrest relative to the seat part can be controlled in an improved manner in the event of an accident-induced application of force. It was namely the case hitherto that the respective fitting or the deformation element fastened to the fitting was directly supported with respect to the laterally corresponding seat side part. On account of the necessarily present fastening and supporting forces between the respective fitting or the associated deformation element and the seat side part, both of which are typically formed from a corresponding metal material, considerable friction components had to be taken into consideration in the accident-induced rearward displacement of the backrest relative to the seat part, which friction components, moreover, could considerably fluctuate on account of different material pairings or connection forces. By virtue of the now provided intermediate arrangement of a corresponding sliding element between the fitting or the deformation element associated therewith on the one hand and the laterally associated seat side part on the other hand, these friction components can be considerably reduced and accordingly a considerably more reliable, better controllable displacement movement of the backrest relative to the seat part can be achieved in the event of an accident-induced overload.

In a further embodiment of the invention, the sliding element is arranged between the deformation element, which is fastened to the fitting, and the seat side part. Accordingly, the deformation element is preferably fastened directly to the fitting, then resulting in the reduced friction, produced by means of the sliding element, between the deformation element arranged on the fitting side and the seat side part. The arrangement of the deformation element directly on the fitting accordingly results overall in a particularly simple and readily mountable configuration of the vehicle seat.

In a further embodiment of the invention, it has been shown to be advantageous if, on that side of the fitting facing away from the sliding element, a further sliding element is arranged between said fitting and a bolt head. The friction on that side of the fitting facing away from the sliding element can thus also be further reduced by the further sliding element.

A further advantageous embodiment of the invention provides that the bolt head is spaced apart from the seat side part by means of a bushing on which the at least one sliding element is arranged on the outer circumferential side. The combination of the bolt with the bushing, by means of which the bolt is defined in its relative position with respect to the seat side part, accordingly ensures particularly favorable reception of the fitting mounted pivotably about the bolt, wherein the arrangement of the sliding elements on the outer circumferential side allows particularly favorable positioning of these sliding elements.

A further advantageous embodiment of the invention provides that the sliding element is formed as a plastic element, metal element or the like from a friction-reducing material or is provided with a friction-reducing coating or the like. As a result, reduced friction is also intended to be produced in the event of an accident-induced displacement movement of the backrest relative to the seat part. In particular, it is conceivable here to use a plastic element with a corresponding coating since, on the one hand, said element has a sufficient ductility or compliance for rattle-free mounting of the fitting and, on the other hand, allows the described advantages as a result of the friction-reducing coating. However, metal elements made of PTFE or the like are also conceivable, for example.

In a further embodiment of the invention, the sliding element is provided with a friction-reducing surface, in particular a corrugated contour or the like. Such a surface makes it possible, on the one hand, to produce a corresponding ductility or softness such that a rattle-free arrangement of the fitting is possible, and, on the other hand, the surface contacting the respective component, for example the seat side part and the fitting side, is thereby reduced in order thereby to minimize the friction component.

In addition, it has been shown to be favorable if the deformation guide of the deformation element has a bushing opening which is adapted to an outer cross section of the bushing and which is adjoined by a deflection opening, wherein respective absorption elevations are provided between the bushing opening and the deflection opening. In the event of an accident-induced overload, such a deformation guide allows, on the one hand, an extremely uniform displacement movement of the backrest relative to the seat part and, on the other hand, reliable energy absorption during this displacement movement.

Further features of the invention will emerge from the claims, the figures and the description of the figures. The features and combinations of features mentioned above in the description and also the features and combinations of features mentioned below in the description of the figures and/or shown in the figures alone may be used not only in the respectively specified combination but also in other combinations or in isolation.

The invention will now be explained in more detail on the basis of a preferred exemplary embodiment and with reference to the drawings.

DETAILED DESCRIPTION OF THE DRAWINGS

Figure 1:
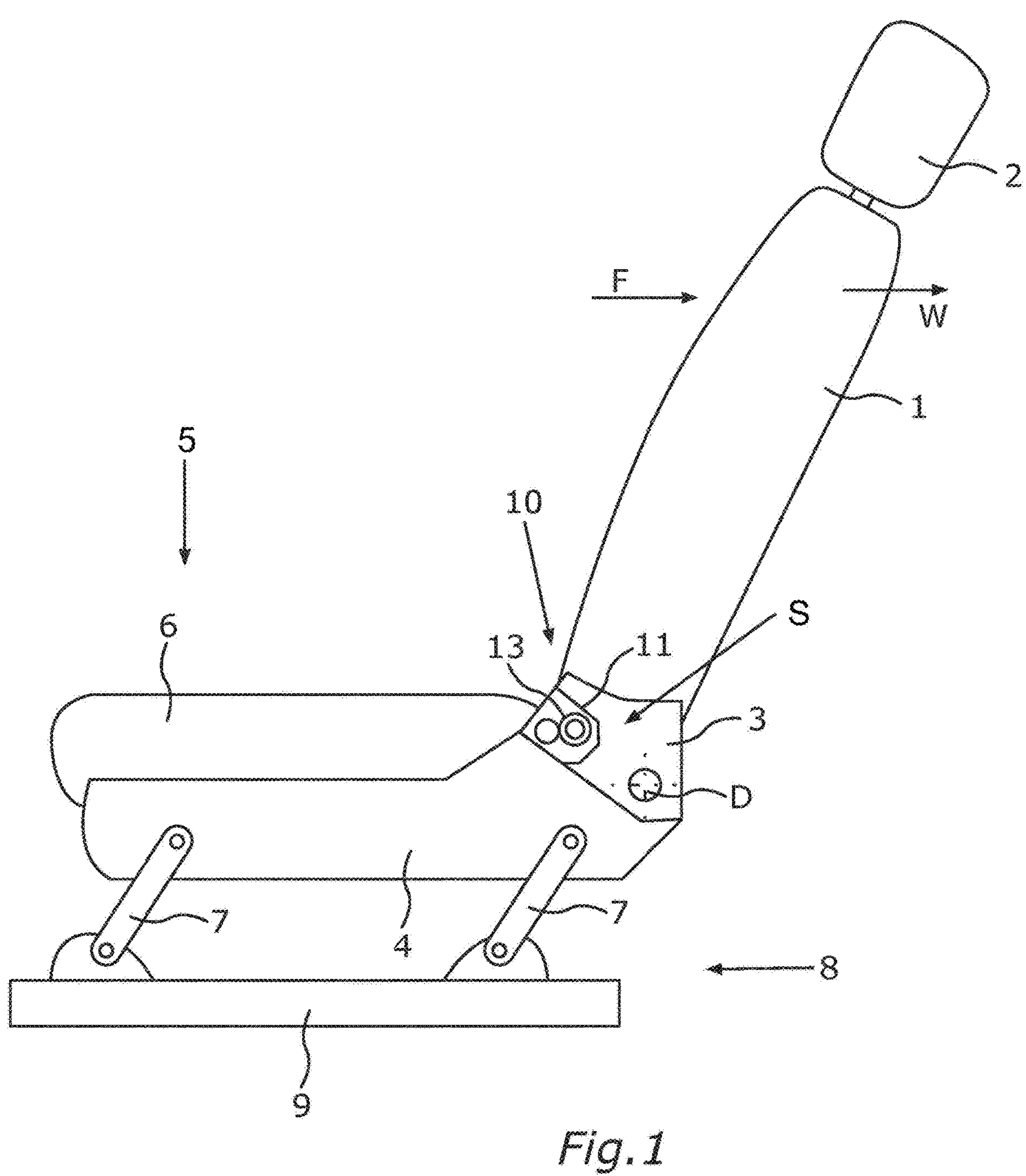
FIG. 1 is a schematic side view of a vehicle seat for a motor vehicle having a backrest which is mounted, so as to be pivotable about a pivot axis, on a respective fitting which is arranged on the associated seat side of a seat part and is connected to a seat side part, which is arranged on the respective seat side, of the seat part via a deformation device by which the backrest can be pivoted rearward through an angle in the event of an accident-induced overload as a result of a rear impact.

FIG. 1 is a schematic side view showing a vehicle seat for a motor vehicle having a backrest 1 on whose upper side a separate headrest 2 is arranged. However, it is clear that the present invention can also be applied to integral seats. The backrest 1 is arranged on a respective laterally associated seat side part 4 of a seat part 5 by means of a respective fitting 3 arranged on the laterally associated seat side. Accordingly, for each seat side of the vehicle seat, a respective fitting 3 is fastened to the corresponding seat side part 4, wherein the backrest 1 is pivotably held between the two laterally arranged fittings 3 so as to be pivotable about a pivot axis S. The pivot axis S extends horizontally in the seat transverse direction such that the backrest 1 can be adjusted in its angle of inclination with respect to the seat part 5. On a lower side opposite to a seat cushion 6, the seat part 5 or the respective seat side parts 4 is or are height-adjustably supported in a manner known per se via respective link levers 7 of a seat underframe 8 on respective longitudinal rails 9 along which the vehicle seat is longitudinally adjustable in the vehicle longitudinal direction.

Furthermore, it can be seen from FIG. 1 that in the present case a deformation device 10 is in each case arranged between the backrest 1 and the seat part 5 in the region of the respective lateral fittings 3, by means of which deformation device 10, in the event of a rear impact on the motor vehicle, the backrest 1 can be pivoted rearward about an axis of rotation D, which extends in the seat transverse direction and approximately horizontally by an angular amount with respect to the seat part 5 and accordingly travels a distance w, indicated by an arrow, by way of its upper region. If inertia-induced plunging of a seat occupant into the vehicle seat occurs namely in the event of such a rear impact and if there accordingly occurs an accident-induced excessive force F, which is referred to below as overload and is indicated by an arrow in the upper region of the backrest 1, the corresponding pivoting of the backrest 1 about the axis of rotation D has the effect of reducing corresponding acceleration peaks which act on the seat occupant. If accordingly, as a result of the rear impact, the seat occupant plunges into the backrest 1 owing to inertia with a correspondingly high force F or overload until he or she here correspondingly impinges the supporting structures of the backrest 1, accident-induced compliance or accident-induced pivoting of the backrest about the axis of rotation D occurs. The compliance of the deformation devices 10 in the region of the respective fittings 3 is ensured here by respective deformation elements 11 which will be explained below from a combination of FIGS. 2 to 4.

Figure 2:
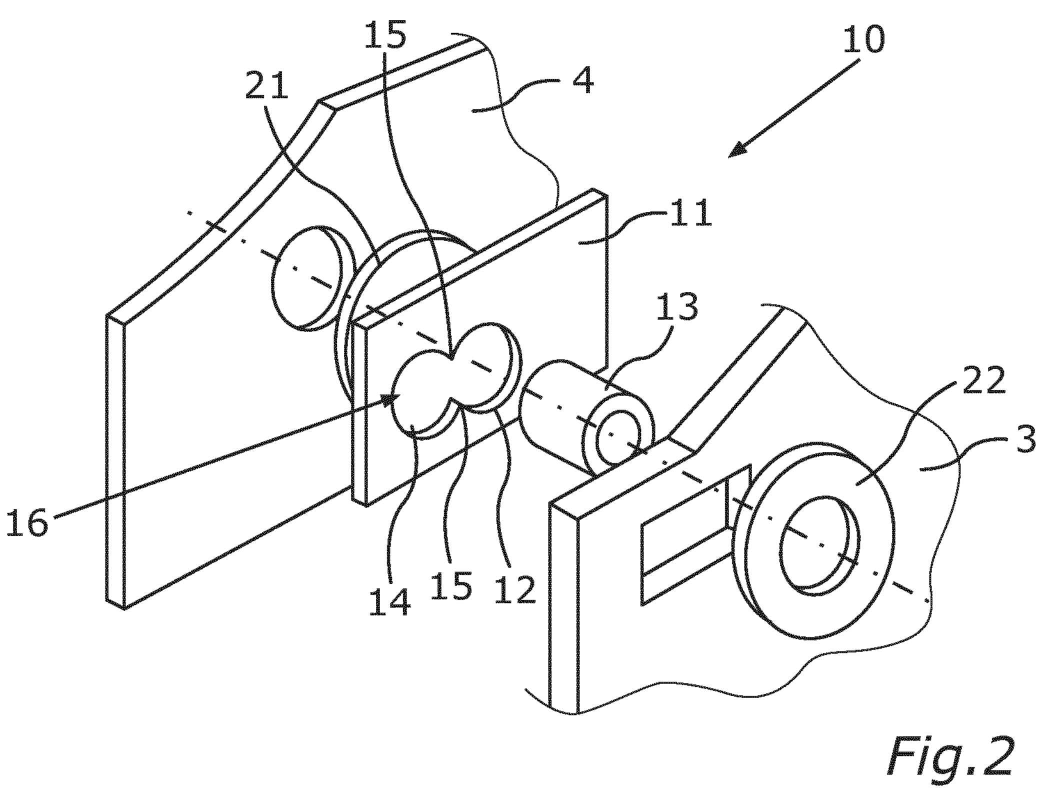
FIG. 2 is a perspective exploded illustration of the deformation device.
Figure 3:
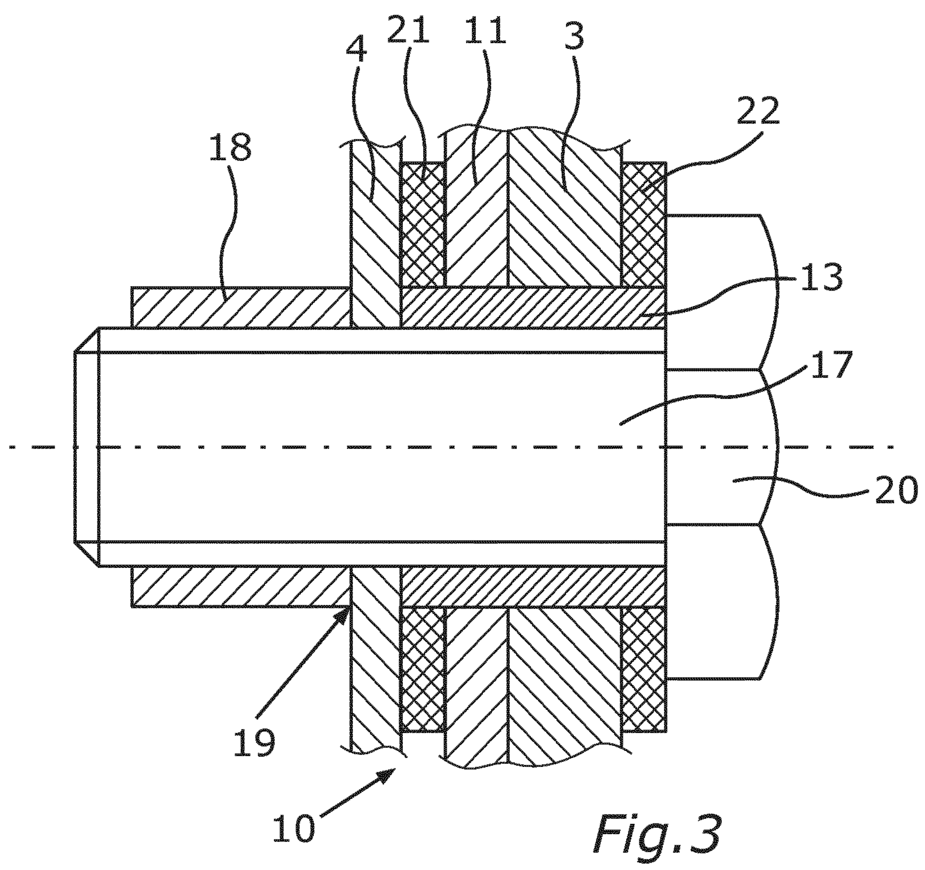
FIG. 3 is a sectional view through the deformation device.

FIG. 2 here shows an exploded illustration of one of the two deformation devices 10 which is arranged on the corresponding seat side of the vehicle seat between the respective fitting 3 and the laterally associated seat side part 4. FIG. 3 shows a sectional view through the deformation device 10 assembled on the corresponding seat side.

Figure 4A:
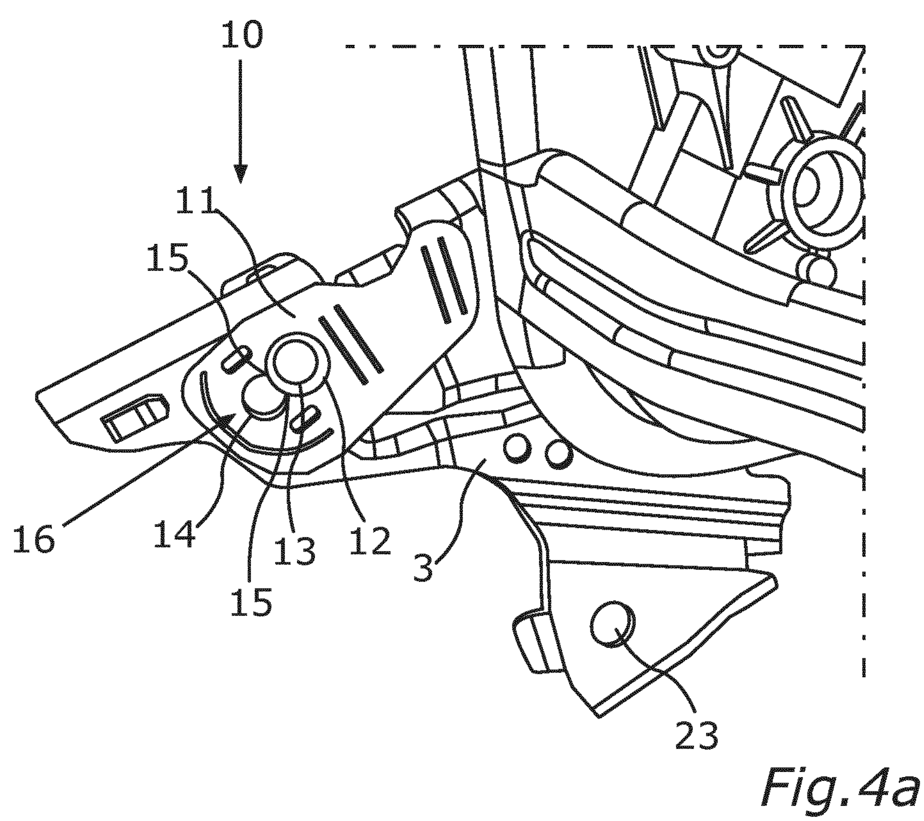
FIGS. 4*a*, 4*b* are respective perspective side views of one of the fittings by which the backrest is fastened to the laterally corresponding seat side part of the seat part, wherein in addition the deformation device can be seen on sides of the respective fitting.
Figure 4B:
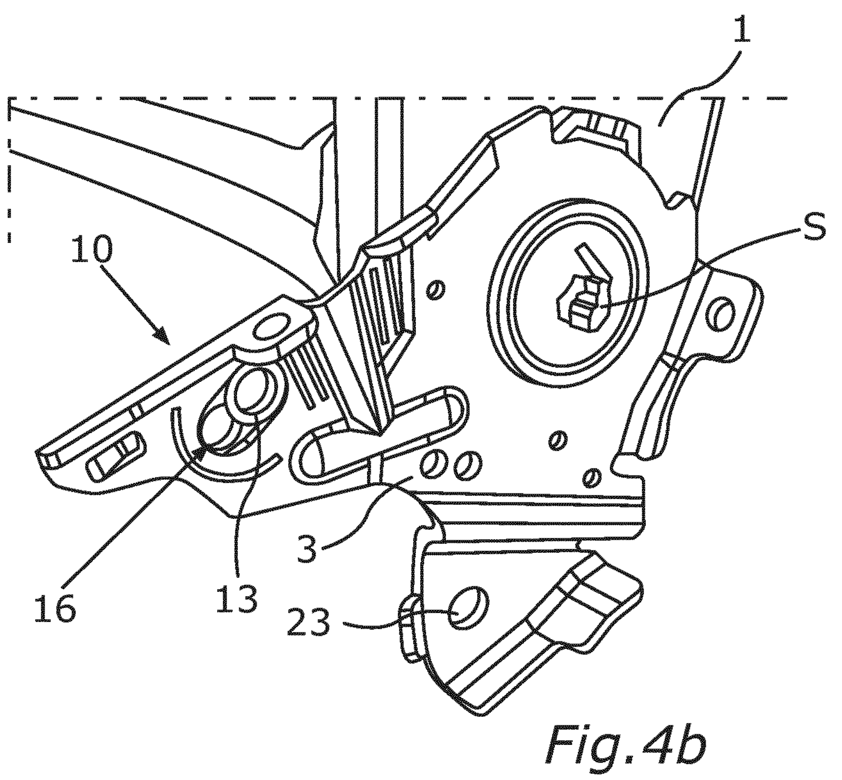

Moreover, FIGS. 4*a* and 4*b* are respective perspective side views showing a detail of one of the two fittings 3 on which the backrest 1 is held so as to be pivotable about the pivot axis S.

The combination of FIGS. 2 to 4*b* shows that the deformation element 11 is arranged on the inner side of the fitting 3 and on the outer side of the seat side part 4 between these components. More precisely, the presently approximately plate-shaped deformation element 11, which is produced from a corresponding metal part or metal sheet, is fastened on the inner side of the laterally associated fitting 3, for example by means of corresponding welded connections or the like. It is clear here, in particular from FIGS. 2 and 4*a* and 4*b*, that the deformation element 11 has a bushing opening 12 which is adapted in its cross section to an outer cross section of a bushing 13. In the present case, the bushing 13 is formed as a tubular stub and accordingly the bushing opening 12 is at least substantially circular. This bushing opening 12 is adjoined by a deflection opening 14 which, for example, is also circular in its cross section and is adapted to the outer cross section of the bushing 13. However, where appropriate, the deflection opening 14 can also have a different shape. Between the bushing opening 12 and the deflection opening 14 are provided respective absorption elevations 15 which are formed by virtue of the fact that the two openings, the bushing opening 12 and the deflection opening 14, are spaced apart in such a way that they form approximately a figure "eight" in their overall shape. In addition, the bushing opening 12 and the deflection opening 14 form overall a deformation guide 16 along which, in the event of an above-described overload acting on the backrest, the bushing 13 can be moved in a manner which will be described in more detail below.

In particular a combination of FIGS. 2 and 3 shows how the respective lateral deformation device 10 is arranged between the respective laterally associated fitting 3 and the respective laterally associated seat side part 4. The bushing 13, which is preferably produced from a corresponding metal or steel material, is in the present case traversed by a screw bolt 17 which is held by means of a threaded bushing 18 arranged on that side of the seat side part 4 facing away from the fitting 3. The threaded bushing 18 is here for example secured on the inner side of the corresponding seat side part 4 by a welded connection 19. The screw bolt 18 screwed into the threaded bushing 18 has a bolt head 20 which is arranged spaced apart at a corresponding distance from the outer side of the seat side part 4 by means of the bushing 13. In other words, the bushing 13 is supported on the one hand on the bolt head 20 and on the other hand on the seat side part 4.

The fitting 3, which is produced for example from a steel sheet, and the deformation element 11 fastened thereto on the inner side are arranged on the outer circumferential side of the bushing 13 between the bolt head 20 and the seat side part 4. In addition, between the fitting 3 and the deformation element 11 arranged thereon is arranged a sliding element 21 which, in a manner which will be described in more detail below, is intended to reduce the friction between the fitting 3 and the associated deformation element 11 on the one hand and the seat side part 4 on the other hand. This sliding element 21 is in the present case formed as a plastic disc which is tailored in its inner circumference to the outer circumference of the bushing 13 and is thus arranged on the outer circumferential side of the bushing 13. The sliding element 21 can be formed as a plastic element which is provided with a corresponding friction-reducing coating. It is equally also possible to use a plastic element which consists per se of a friction-reducing material. Also contemplated is the use of corresponding metal elements, for example made of PTFE, or provided with a PTFE coating. Moreover, the sliding element 21 can also be provided with, or comprise, a friction-reducing surface, in particular a corrugated contour or the like.

In addition, a further sliding element 22 is arranged on that side of the fitting 3 facing away from the first sliding element 21, between said fitting and the bolt head 20. This sliding element 22 also serves, in a manner which will be described in more detail below, for reducing friction during the displacement movement of the backrest 1 as a result of an accident-induced overload.

It can thus be seen from FIG. 3 that the assembly of the respective fitting 3 and the deformation element 11 between the bolt head 20 on the one hand and the seat side part 4 on the other hand occurs via the respective sliding elements 21, 22. These sliding elements 21, 22 have not only a friction-reducing effect but are also intended to ensure the rattle-free arrangement of the fitting 3 and the deformation element 11 on the seat side part 4. For this purpose, the sliding elements 20, 21 are produced from a correspondingly ductile or compliant material, for example a plastic, which can be compressed to a certain degree. By virtue of a corresponding, above-described corrugated shape of the respective sliding elements 21, 22, the described compliance of the respective sliding element 21, 22 can also be achieved. Furthermore, a corresponding corrugated shape of the sliding elements 21, 22 also brings about respectively smaller contact with the adjoining components, which also has a friction-reducing effect.

If an accident-induced application of force and overload then occurs in the region of the backrest 1 as a result of a rear impact, said backrest can be displaced about the corresponding axis of rotation D, which is formed on the fittings 3 by respective rotation points 23. Here, owing to the accident, the bushing 13 traversed by the laterally respectively associated bolt 17 is displaced along the respectively associated deformation guide 16 out of the respective bushing opening 12 into the respectively associated deflection opening 14. This occurs with deformation of the respective absorption elevations 15 between the two openings 14, 16 such that, during a corresponding displacement movement of the respective bushing 13 and the deformation of the respective absorption elements 15, energy is correspondingly consumed or absorbed.

In order to be able to better control this displacement movement of the respective bushing 13 within the associated deformation element 11 and correspondingly also the displacement movement of the respective fitting 3, which is connected to the deformation element 11, relative to the laterally associated seat side part 4, the corresponding sliding element 21 is provided at least between the fitting 3 and the deformation element 11 on the one hand and the seat side part 4 on the other hand, and the corresponding other sliding element 22 is preferably also provided between the fitting 3 and the bolt head 20. The sliding elements 21, 22 therefore bring about a reduction in the friction components between the fitting 3 and the deformation element 11 on the one hand and the seat side part 4 on the other hand, with the result that a considerably more controllable, disturbance-free displacement movement of the backrest 1 can be achieved in the event of an accident-induced overload.

LIST OF REFERENCE SIGNS

1 Backrest
2 Headrest
3 Fitting
4 Seat side part
5 Seat part
6 Seat cushion
7 Link lever
8 Seat underframe
9 Longitudinal rails
10 Deformation device
11 Deformation element
12 Bushing opening
13 Bushing
14 Deflection opening
15 Absorption elevations
16 Deformation guide
17 Bolt
18 Threaded bushing
19 Welded connection
20 Bolt head
21 Sliding element
22 Sliding element
23 Rotation points

What is claimed is:

1. A vehicle seat for a motor vehicle, comprising:

a backrest;

a seat side part of a seat part, the seat side part being located on a side of the vehicle seat;

a first pivot axis about which the seat back is adjustably pivotable relative to the seat part;

a fitting connected to the seat side part on the side of the vehicle seat;

a deformation device via which the backrest is mounted on the fitting so as to be pivotable about a second pivot axis which is different from the first pivot axis, wherein the deformation device comprises a bolt which is received in a deformation element on the fitting and is displaceable along a deformation guide in an event of an accident-induced overload; and a sliding element arranged between the fitting and the seat side part.

2. The vehicle seat according to claim 1, wherein the sliding element is formed as a plastic element or a metal element from a friction-reducing material or with a friction-reducing coating.

3. The vehicle seat according to claim 1, wherein the sliding element is arranged between the deformation element, which is fastened to the fitting, and the seat side part.

4. The vehicle seat according to claim 3, wherein on that side of the fitting facing away from the sliding element, a further sliding element is arranged between said fitting and a bolt head of the bolt.

5. The vehicle seat according to claim 1, further comprising:

a bushing by which the bolt head is spaced apart from the seat side part, wherein on the bushing the sliding element is arranged on an outer circumferential side.

6. The vehicle seat according to claim 5, wherein the deformation guide of the deformation element has a bushing opening which is adapted to an outer cross section of the bushing and which is adjoined by a deflection opening, wherein respective absorption elevations are provided between the bushing opening and the deflection opening.

7. The vehicle seat according to claim 1, wherein the sliding element has a friction-reducing surface.

8. The vehicle seat according to claim 7, wherein the sliding element has a corrugated contour to facilitate the friction reducing surface.

* * * * *